United States Patent
Wu et al.

(10) Patent No.: US 12,519,184 B2
(45) Date of Patent: Jan. 6, 2026

(54) CONNECTING MEMBER, FLEXIBLE BATTERY, ELECTRONIC DEVICE, AND MANUFACTURING METHOD

(71) Applicant: BOE TECHNOLOGY GROUP CO., LTD., Beijing (CN)

(72) Inventors: Lu Wu, Beijing (CN); Sitong Chen, Beijing (CN); Yue Cui, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 615 days.

(21) Appl. No.: 17/995,317

(22) PCT Filed: Oct. 22, 2021

(86) PCT No.: PCT/CN2021/125643
§ 371 (c)(1),
(2) Date: Oct. 3, 2022

(87) PCT Pub. No.: WO2022/121532
PCT Pub. Date: Jun. 16, 2022

(65) Prior Publication Data
US 2023/0163430 A1    May 25, 2023

(30) Foreign Application Priority Data
Dec. 11, 2020 (CN) .......................... 202011444771.1

(51) Int. Cl.
*H01M 50/00* (2021.01)
*H01B 13/00* (2006.01)
(Continued)

(52) U.S. Cl.
CPC ...... *H01M 50/534* (2021.01); *H01B 13/0036* (2013.01); *H01B 13/06* (2013.01);
(Continued)

(58) Field of Classification Search
CPC .... H01M 50/534; H01M 13/06; H01M 13/00; H01M 55/533; H01M 50/536; H01M 50/136
See application file for complete search history.

(56) References Cited

U.S. PATENT DOCUMENTS

| 11,600,979 B2 * | 3/2023 | Baseri ................. H01M 50/502 |
| 2013/0001186 A1 | 1/2013 | Sakaguchi et al. |
| 2017/0005504 A1 | 1/2017 | Rho et al. |

FOREIGN PATENT DOCUMENTS

| CN | 102771197 A | 11/2012 |
| CN | 104004480 A | 8/2014 |

(Continued)

OTHER PUBLICATIONS

Choi et al, Pouch Type Secondary Battery Having Enhanced Electrical Insulation and Wetting Properties, Jun. 2013, See the Abstract. (Year: 2013).*

(Continued)

*Primary Examiner* — Tiffany Legette
*Assistant Examiner* — Monique M Wills
(74) *Attorney, Agent, or Firm* — DINSMORE & SHOHL LLP

(57) ABSTRACT

The present disclosure provides a connecting member for a flexible battery, a flexible battery, an electronic device, and a manufacturing method. The connecting member includes: a first polymer layer; a flexible conductive layer on a surface of the first polymer layer, the flexible conductive layer being in direct contact with the first polymer layer; a bonding layer on a side of the flexible conductive layer away from the first polymer layer; and a second polymer layer on a side of the bonding layer away from the flexible conductive layer.

14 Claims, 8 Drawing Sheets

(51) Int. Cl.
  *H01B 13/06* (2006.01)
  *H01M 50/136* (2021.01)
  *H01M 50/533* (2021.01)
  *H01M 50/534* (2021.01)
  *H01M 50/536* (2021.01)

(52) U.S. Cl.
  CPC ....... *H01M 50/136* (2021.01); *H01M 50/533* (2021.01); *H01M 50/536* (2021.01); *H01M 2220/30* (2013.01)

(56) References Cited

FOREIGN PATENT DOCUMENTS

| | | | | |
|---|---|---|---|---|
| CN | 108274865 A | 7/2018 | | |
| CN | 110085916 A | 8/2019 | | |
| CN | 111446486 A | 7/2020 | | |
| CN | 214898781 U | 11/2021 | | |
| JP | 2020017396 A | 1/2020 | | |
| KR | 20130070624 A | * | 6/2013 | .......... H01M 50/183 |
| WO | 2017062886 A1 | | 4/2017 | |
| WO | WO-2018013854 A1 | * | 1/2018 | ........ H01M 10/0585 |
| WO | 2020159218 A1 | | 8/2020 | |

OTHER PUBLICATIONS

Berland et al, Thin-Film Battery With Adhesive Layer, Jan. 2018, See the Abstract. (Year: 2018).*
Application No. 202022964634.2, Notification of First Office Action, date of notification May 27, 2021.
International Search Report relating to PCT/CN2021/125643 filed Oct. 22, 2021; Mail Date: Jan. 19, 2022.
German Office Action dated Sep. 27, 2024 relating to DE Patent Application No. 11 202 1 002 192.3.

* cited by examiner

CONNECTING MEMBER, FLEXIBLE BATTERY, ELECTRONIC DEVICE, AND MANUFACTURING METHOD

CROSS-REFERENCE TO RELATED APPLICATIONS

The present application is a U.S. National Stage Application under 35 U.S.C. § 371 of International Patent Application No. PCT/CN2021/125643, filed on Oct. 22, 2021, which claims priority to China Patent Application No. 202011444771.1 filed on Dec. 11, 2020, the disclosure of both of which are incorporated by reference herein in entirety.

TECHNICAL FIELD

The present disclosure relates to a connecting member for a flexible battery, a flexible battery, an electronic device and a manufacturing method.

BACKGROUND

With the increasing demand for smart devices and electronic products, a series of products such as flexible electronic devices, wearable electronic devices, implantable biomedical systems, repairable biomedical systems, and electric vehicles are widely used, which inspires the unremitting pursuit for high-performance batteries having high energy density, shape diversity, deformation diversity and favorable mechanical properties.

SUMMARY

According to an aspect of embodiments of the present disclosure, a connecting member for a flexible battery is provided. The connecting member comprises: a first polymer layer; a flexible conductive layer on a surface of the first polymer layer, wherein the flexible conductive layer is in direct contact with the first polymer layer; a bonding layer on a side of the flexible conductive layer away from the first polymer layer; and a second polymer layer on a side of the bonding layer away from the flexible conductive layer.

In some embodiments, the flexible conductive layer is connected to a tab for an energy storage member, and the bonding layer covers at least a portion of the tab.

In some embodiments, a material of the flexible conductive layer comprises: at least one of metal, conductive polymer or non-conductive polymer with a treated metal surface.

In some embodiments, materials of the first polymer layer and the second polymer layer each comprise: at least one of polyimide, polyethylene terephthalate or polyvinylidene chloride.

In some embodiments, the bonding layer comprises: at least one of natural rubber, synthetic rubber, thermoplastic elastomer, polyacrylate, polyurethane, polyvinyl chloride or polyvinyl ether.

In some embodiments, the flexible conductive layer comprises: a first flexible conductive layer and a second flexible conductive layer spaced apart from the first flexible conductive layer.

According to another aspect of the embodiments of the present disclosure, a flexible battery is provided. The flexible battery comprises: the connecting member described above; and a plurality of energy storage members located on the connecting member, and electrically connected to the connecting member.

In some embodiments, the connecting member comprises a first flexible conductive layer and a second flexible conductive layer spaced apart from the first flexible conductive layer; and each of the plurality of energy storage members comprises a positive electrode tab and a negative electrode tab, wherein the positive electrode tab is connected to the first flexible conductive layer, and the negative electrode tab is connected to the second flexible conductive layer.

In some embodiments, extending directions of any two energy storage members of the plurality of energy storage members are parallel; an extending direction of the first flexible conductive layer is parallel to an extending direction of the second flexible conductive layer; and the extending direction of the first flexible conductive layer is perpendicular to an extending direction of any one of the plurality of energy storage members.

In some embodiments, the plurality of energy storage members are arranged at equal intervals along the extending direction of the first flexible conductive layer, and the first flexible conductive layer and the second flexible conductive layer are arranged along the extending direction of any one of the plurality of energy storage members.

In some embodiments, the flexible battery further comprises: a conductive member connected to the flexible conductive layer of the connecting member.

In some embodiments, the flexible battery further comprises: an encapsulation layer surrounding the connecting member and the plurality of energy storage members.

According to another aspect of embodiments of the present disclosure, an electronic device is provided. The electronic device comprises the flexible battery described above.

According to another aspect of the embodiments of the present disclosure, a manufacturing method of a connecting member for a flexible battery is provided. The manufacturing method comprises: forming a flexible conductive layer on a surface of a first polymer layer, wherein the flexible conductive layer is in direct contact with the first polymer layer; and adhering a second polymer layer to a side of the flexible conductive layer away from the first polymer layer by a bonding layer.

In some embodiments, the flexible conductive layer is formed on a surface of the first polymer layer by a deposition process.

In some embodiments, the deposition process comprises: at least one of a thermal evaporation process, a magnetron sputtering process, chemical vapor deposition, atomic layer deposition, electrodeposition, a spraying process, a chemical plating process, a spin coating method or a dip pulling method.

In some embodiments, the manufacturing method further comprises: welding a tab for an energy storage member on the flexible conductive layer before adhering the second polymer layer to the side of the flexible conductive layer away from the first polymer layer.

Other features and advantages of the present disclosure will become apparent from the following detailed description of exemplary embodiments of the present disclosure in conjunction with the accompanying drawings.

BRIEF DESCRIPTION OF THE ACCOMPANYING DRAWINGS

The accompanying drawings which constitute part of this specification, illustrate the exemplary embodiments of the present disclosure, and together with this specification, serve to explain the principles of the present disclosure.

The present disclosure may be more explicitly understood from the following detailed description in conjunction with the accompanying drawings, in which.

Figure 1:
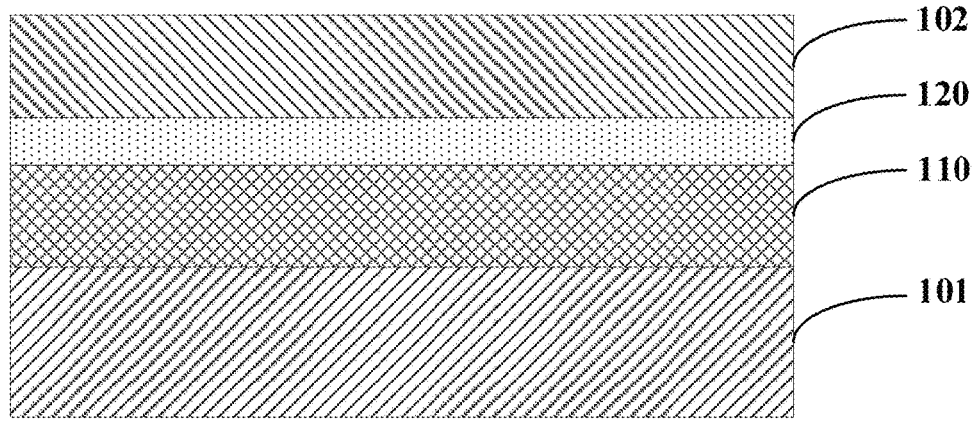
FIG. 1 is a schematic cross-sectional view showing a connecting member for a flexible battery according to an embodiment of the present disclosure.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail in conjunction with the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include", or the like means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (comprising technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

For a flexible lithium battery, its key technical core is to obtain a favorable flexibility on the basis of maintaining the electrochemical property of traditional lithium batteries. It is a technical solution to realize a flexible battery by decoupling the energy storage unit and the flexible portion of a lithium battery. The battery may be separated into a rigid energy storage member and a flexible connecting member. Rigid energy storage members are connected by flexible connecting members. The flexibility of the battery is achieved by bending the flexible connecting member.

For example, a bamboo-shaped battery is an implementation solution to realize a flexible battery by decoupling the energy storage member and the flexible connecting member of the lithium battery. A structure of the bamboo-shaped battery comprises a plurality of energy storage members, which are connected by flexible connecting members. The energy storage member is compatible with the structure, material and process of traditional rigid lithium-ion batteries; and the flexible connecting member may be realized by adopting a diaphragm and an encapsulating material in a body structure of the lithium-ion battery or introducing a new flexible connection material such as a flexible circuit board or a flexible composite layer. The bamboo-shaped battery based on the decoupling of the energy storage member and the flexible connecting member of the lithium battery may be applied to a flexible product required to be bent, folded, or even twisted in shape, for example, a flexible bracelet, curled display, folded display, or the like.

In the related art, for a flexible battery (for example, a bamboo-shaped battery) comprising an energy storage member and a flexible connecting member, the flexible connecting member is a composite film structure formed by bonding the polymer film layer on the upper and lower sides of the flexible conductor layer through the adhesive material layer. That is, in the flexible connecting member of the related art, the upper and lower sides of the flexible conductor layer are attached with the polymer film layer through the adhesive material layer respectively. However, the inventors of the present disclosure have found that, the flexible connecting member of the flexible battery in the related art has a relatively short fatigue life. Here, the fatigue life refers to maximum bending times that can be achieved by the flexible connecting member before fracture during repeated bending tests under the condition of a certain bending radius.

In view of this, the embodiments of the present disclosure provide a connecting member for a flexible battery to improve the fatigue life of the connecting member.

FIG. 1 is a schematic cross-sectional view showing a connecting member for a flexible battery according to an embodiment of the present disclosure.

As shown in FIG. 1, the connecting member comprises a first polymer layer 101. In some embodiments, the first polymer layer 101 is a polymer film layer. For example, a material of the first polymer layer comprises: at least one of polyimide, polyethylene terephthalate or polyvinylidene chloride.

As shown in FIG. 1, the connecting member further comprises a flexible conductive layer 110 on a surface of the first polymer layer 101. The flexible conductive layer 110 is in direct contact with the first polymer layer 101. For example, a material of the flexible conductive layer 110 comprises: at least one of metal, conductive polymer or non-conductive polymer with a treated metal surface. For example, the metal comprises at least one of stainless steel, aluminum, nickel, titanium, copper, or aluminum-cadmium alloy. For example, the stainless steel is a surface treated stainless steel with carbon, nickel, titanium, silver, gold, platinum, or the like. The flexible conductive layer is configured to realize the electrical connection between energy storage members of the flexible battery.

As shown in FIG. 1, the connecting member further comprises a bonding layer 120 on a side of the flexible conductive layer 110 away from the first polymer layer 101. In some embodiments, the bonding layer 120 is an adhesive layer. For example, the bonding layer 120 comprises: at least one of natural rubber, synthetic rubber, thermoplastic elastomer, polyacrylate, polyurethane, polyvinyl chloride or polyvinyl ether.

As shown in FIG. 1, the connecting member further comprises a second polymer layer 102 on a side of the bonding layer 120 away from the flexible conductive layer 110. In some embodiments, the second polymer layer 102 is a polymer film layer. For example, a material of the second polymer layer 102 comprises: at least one of polyimide, polyethylene terephthalate or polyvinylidene chloride.

So far, a connecting member for a flexible battery according to some embodiments of the present disclosure is provided. The connecting member is a flexible connecting member. The connecting member comprises: a first polymer layer; a flexible conductive layer on a surface of the first polymer layer, wherein the flexible conductive layer is in direct contact with the first polymer layer; a bonding layer on a side of the flexible conductive layer away from the first polymer layer; and a second polymer layer on a side of the bonding layer away from the flexible conductive layer. In the connecting member of the present disclosure, a lower surface of the flexible conductive layer is in direct contact with the first polymer layer. In the flexible connecting member of the related art, a lower surface of the flexible conductor layer is attached with a polymer film layer through an adhesive material layer. Therefore, compared with the flexible connecting member of the related art, the connecting member of the present disclosure reduces the number of contact interfaces, which can reduce the risk of peeling-off of the interfaces between different layers, thereby improving the fatigue life of the connecting member.

Figure 2:
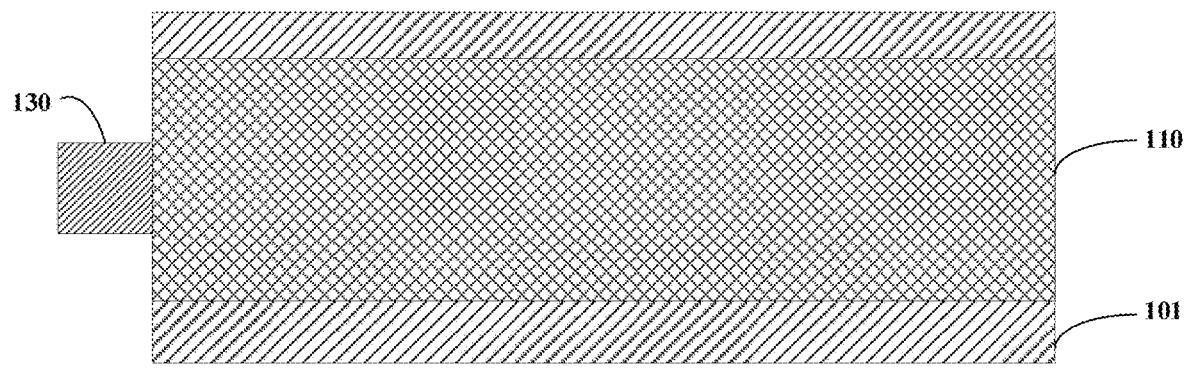
FIG. 2 is a top view showing a connecting member for a flexible battery according to an embodiment of the present disclosure.

FIG. 2 is a top view showing a connecting member for a flexible battery according to an embodiment of the present disclosure.

It should be noted that, for the ease of illustration, the bonding layer 120 and the second polymer layer 102 are not shown in FIG. 2. However, those skilled in the art can understand that, as a matter of fact, the connecting member shown in FIG. 2 comprises the bonding layer 120 and the second polymer layer 102.

In some embodiments, as shown in FIG. 2, the flexible conductive layer 110 of the connecting member is connected with a conductive member 130. The conductive member 130 can be used as a total tab to be electrically connected to another device (not shown in FIG. 2).

In the connecting member shown in FIG. 2, the flexible conductive layer 110 may be connected to a positive electrode tab or a negative electrode tab of an energy storage member. In this way, the connection between the flexible conductive layer and the energy storage member is achieved.

So far, a connecting member for a flexible battery according to other embodiments of the present disclosure is provided. In the connecting member, the flexible conductive layer is an integral flexible conductive layer, and the flexible conductive layer is connected with a conductive member serving as a total tab. The conductive member may serve as part of the flexible battery manufactured and formed using the connecting member.

Figure 3:
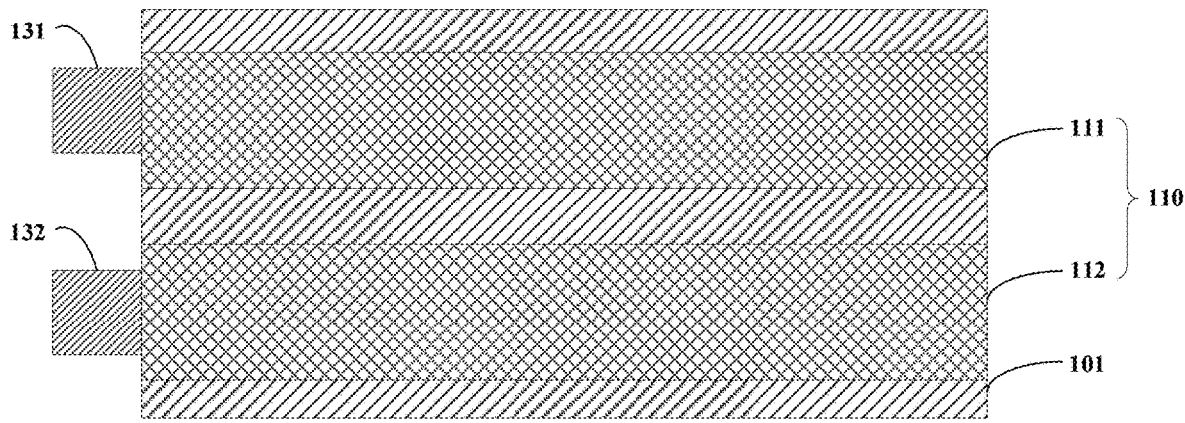
FIG. 3 is a top view showing a connecting member for a flexible battery according to another embodiment of the present disclosure.

FIG. 3 is a top view showing a connecting member for a flexible battery according to another embodiment of the present disclosure.

It should be noted that, for the ease of illustration, the bonding layer 120 and the second polymer layer 102 are not shown in FIG. 3. However, those skilled in the art can understand that, as a matter of fact, the connecting member shown in FIG. 3 comprises the bonding layer 120 and the second polymer layer 102.

In some embodiments, as shown in FIG. 3, the flexible conductive layer 110 comprises: a first flexible conductive layer 111 and a second flexible conductive layer 112 spaced apart from the first flexible conductive layer 111. For example, the first flexible conductive layer 111 and the second flexible conductive layer 112 are separated by the second polymer layer 102 (not shown in FIG. 3). For example, the first flexible conductive layer may be configured to connect a positive electrode tab of an energy storage member (to be described later), and the second flexible conductive layer may be configured to connect a negative electrode tab of the energy storage member. In this way, the connection of the connecting member and the energy storage member is achieved.

In some embodiments, the flexible conductive layer 100 of the connecting member is connected with a conductive member. For example, the conductive member comprises a first conductive member 131 connected to the first flexible conductive layer 111 and a second conductive member 132 connected to the second flexible conductive layer 112. Here, the first conductive member may serve as a first total tab, and the second conductive member may serve as a second total tab.

So far, a connecting member for a flexible battery according to other embodiments of the present disclosure is provided. In the connecting member, the flexible conductive layer comprises a first flexible conductive layer and a second flexible conductive layer, wherein the first flexible conductive layer is connected with a first conductive member, and the second flexible conductive layer is connected with a second conductive member. The first conductive member and the second conductive member may be part of a flexible battery manufactured and formed using the connecting member.

Figure 4:
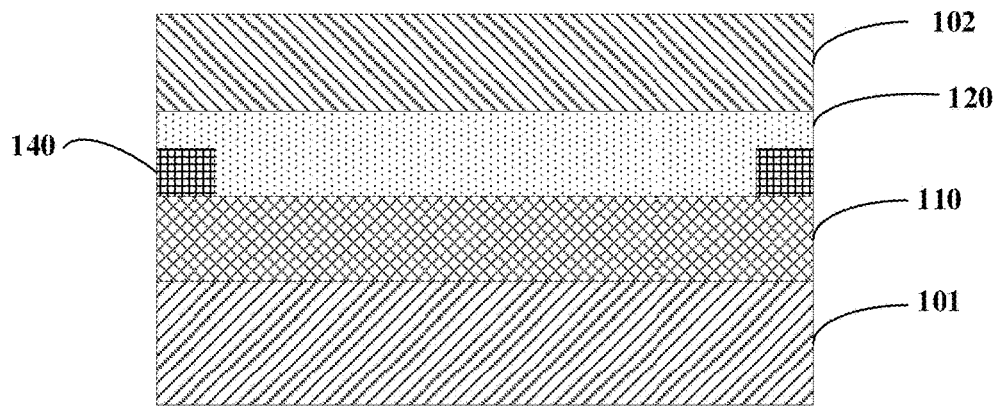
FIG. 4 is a schematic cross-sectional view showing a connecting member for a flexible battery according to another embodiment of the present disclosure.

FIG. 4 is a schematic cross-sectional view showing a connecting member for a flexible battery according to another embodiment of the present disclosure. For example, FIG. 4 may be a schematic cross-sectional view of a structure of a connecting member in FIG. 6B taken along the line A-A'.

Similar to the connecting member shown in FIG. 1, the connecting member shown in FIG. 4 comprises the first polymer layer 101, the flexible conductive layer 110, the bonding layer 120 and the second polymer layer 102.

In some embodiments, as shown in FIG. 4, the flexible conductive layer 110 is connected to a tab 140 for an energy storage member. For example, the tab 140 may be welded on the flexible conductive layer 110. The bonding layer 120 covers at least a portion of the tab 140. In this way, the electrical connection between different energy storage members and the connecting member is achieved.

Figure 5A:
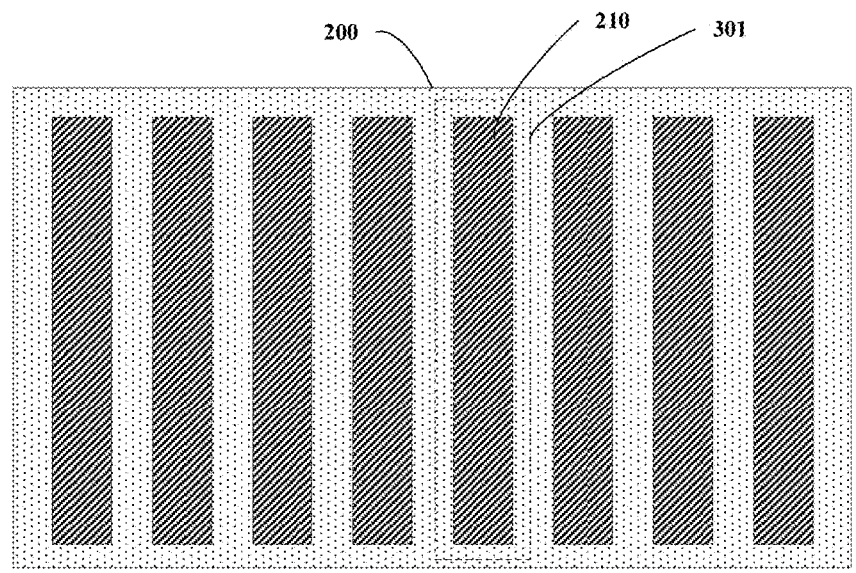
FIG. 5A is a top view showing a flexible battery according to an embodiment of the present disclosure.
Figure 5B:
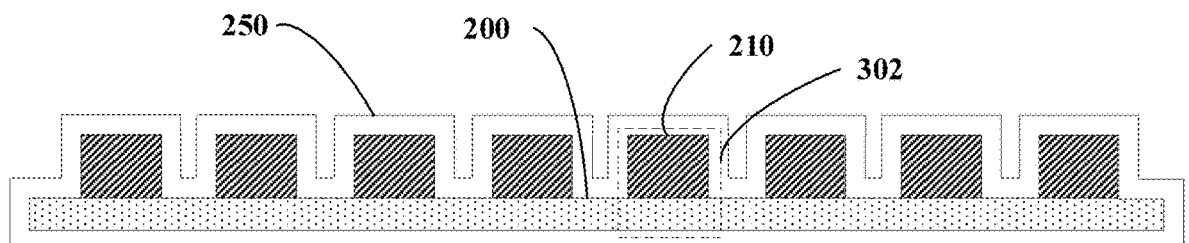
FIG. 5B is a side view showing a flexible battery according to an embodiment of the present disclosure.
Figure 5C:
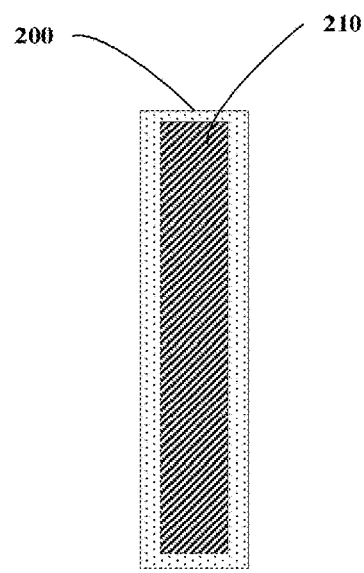
FIG. 5C is an enlarged schematic view showing a structure at block 301 of FIG. 5A.
Figure 5D:
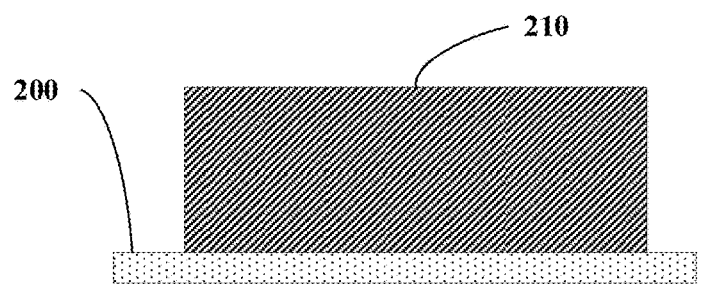
FIG. 5D is an enlarged schematic view showing a structure at block 302 of FIG. 5B.

FIG. 5A is a top view showing a flexible battery according to an embodiment of the present disclosure. FIG. 5B is a side view showing a flexible battery according to an embodiment of the present disclosure. FIG. 5C is an enlarged schematic view showing a structure at block 301 of FIG. 5A. FIG. 5D is an enlarged schematic view showing a structure at block 302 of FIG. 5B.

As shown in FIGS. 5A to 5D, the flexible battery may comprise a connecting member 200 and a plurality of energy storage members 210. The plurality of energy storage members 210 are located on the connecting member 200, and electrically connected to the connecting member 200. For example, the connecting member 200 is the connecting member as described above. Each energy storage member 210 can be connected to the connecting member 200 through a tab. The specific connection condition can be referred to as shown in FIG. 6A to FIG. 6B.

In some embodiments, as shown in FIG. 5B, the flexible battery further comprises an encapsulation layer 250 surrounding the connecting member 200 and the plurality of energy storage members 210. It should be noted that, for the ease of illustrating other structures, the encapsulation layer 250 is not shown in FIGS. 5A, 5C and 5D.

Figure 6A:
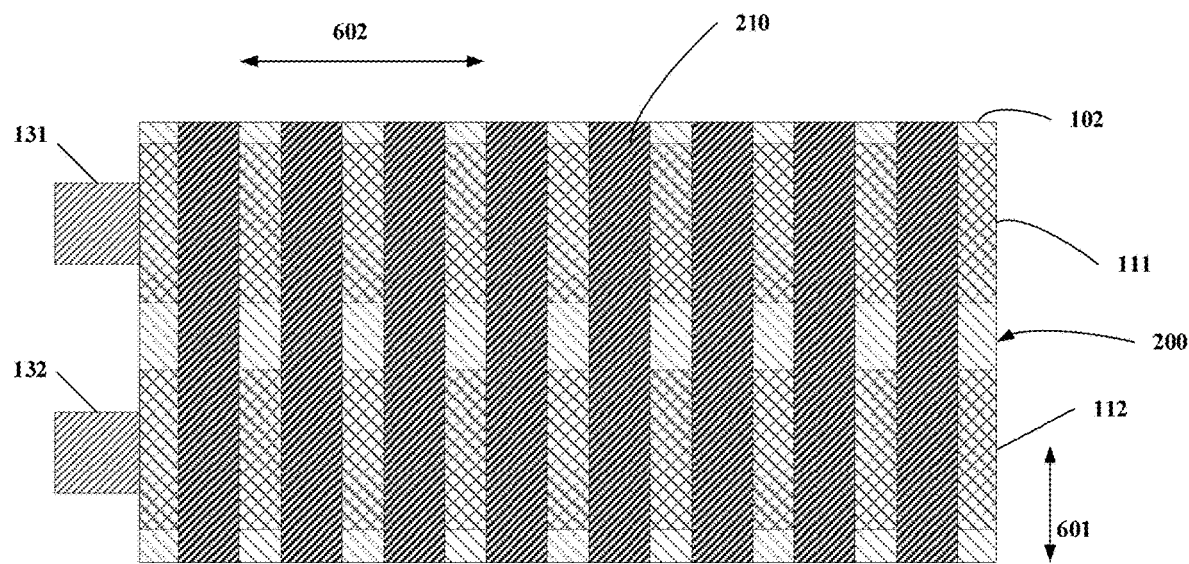
FIG. 6A is a top view showing a flexible battery according to another embodiment of the present disclosure.

FIG. 6A is a top view showing a flexible battery according to another embodiment of the present disclosure. FIG. 6B is a bottom view showing a flexible battery according to another embodiment of the present disclosure. FIG. 6C is a schematic structural view showing an energy storage member of a flexible battery according to an embodiment of the present disclosure.

Figure 6B:
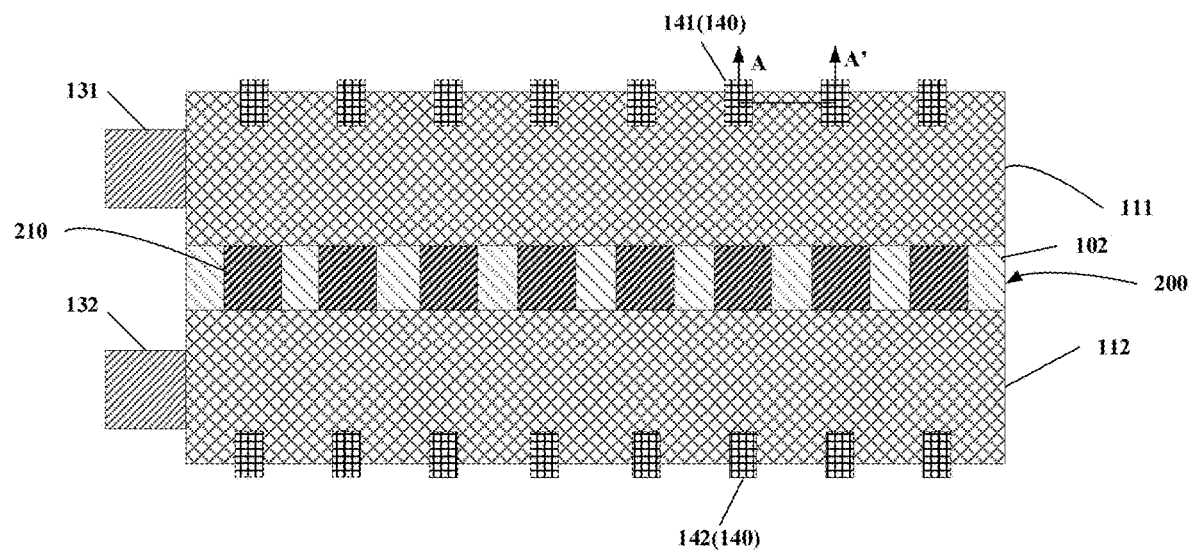
FIG. 6B is a bottom view showing a flexible battery according to another embodiment of the present disclosure.
Figure 6C:
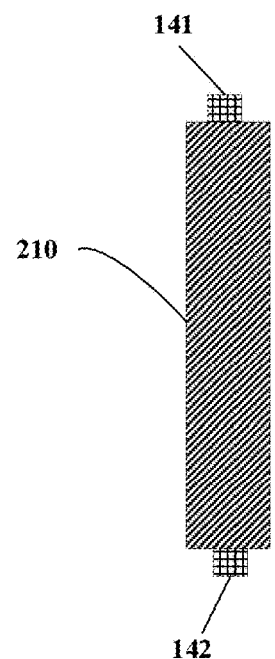
FIG. 6C is a schematic structural view showing an energy storage member of a flexible battery according to an embodiment of the present disclosure.

It should be noted that, for the ease of illustration, the bonding layer 120 and the first polymer layer 101 are not shown in FIGS. 6A and 6B. However, those skilled in the art can understand that, as a matter of fact, the connecting member as shown in FIGS. 6A and 6B comprises the bonding layer 120 and the first polymer layer 101. FIG. 6A shows a front side of the flexible battery, and FIG. 6B shows a back side of the flexible battery opposite to the front side.

In some embodiments, as shown in FIGS. 6A and 6B, the connecting member 200 comprises a first flexible conductive layer 111 and a second flexible conductive layer 112 spaced apart from the first flexible conductive layer 111. As shown in FIG. 6C, each of the plurality of energy storage members 210 comprises a positive electrode tab 141 and a negative electrode tab 142. The positive electrode tab 141 and the negative electrode tab 142 may be located at two opposite edge positions of the energy storage member 210 respectively. The positive electrode tab 141 is connected to the first flexible conductive layer 111, and the negative electrode tab 142 is connected to the second flexible conductive layer 112. For example, the positive electrode tabs 141 of all the energy storage members are connected to the first flexible conductive layer 111, and the negative electrode tabs 142 of all the energy storage members are connected to the second flexible conductive layer 112. In this way, the plurality of energy storage members can be connected to the same connecting member to form a flexible battery.

In some embodiments, as shown in FIG. 6A, extending directions 601 of any two energy storage members of the plurality of energy storage members 210 are parallel. An extending direction 602 of the first flexible conductive layer 111 is parallel to an extending direction 602 of the second flexible conductive layer 112. In some embodiments, the extending direction 602 of the first flexible conductive layer 111 is perpendicular to the extending direction 601 of any one of the plurality of energy storage members 210.

In some embodiments, as shown in FIG. 6A, the plurality of energy storage members 210 are arranged at equal intervals along the extending direction 602 of the first flexible conductive layer 111, and the first flexible conductive layer 111 and the second flexible conductive layer 112 are arranged along the extending direction 601 of any one of the plurality of energy storage members 210. Through the arrangement of the above-mentioned plurality of energy storage members, the flexible battery can be conveniently rolled up.

In some embodiments, the flexible battery further comprises a conductive member connected to the flexible conductive layer of the connecting member. For example, the conductive member comprises a first conductive member 131 connected to the first flexible conductive layer 111 and a second conductive member 132 connected to the second flexible conductive layer 112.

So far, the flexible battery shown in FIGS. 6A to 6B is described, wherein the flexible battery comprises, for example, the connecting member, the plurality of energy storage members, and the conductive member as shown in FIG. 3.

Figure 7A:
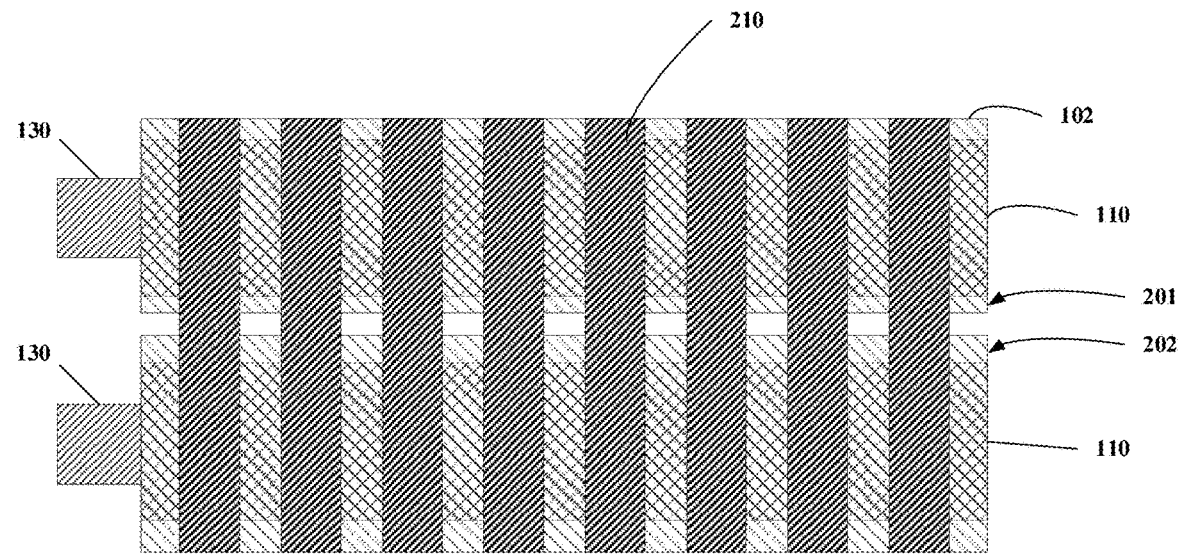
FIG. 7A is a top view showing a flexible battery according to another embodiment of the present disclosure.
Figure 7B:
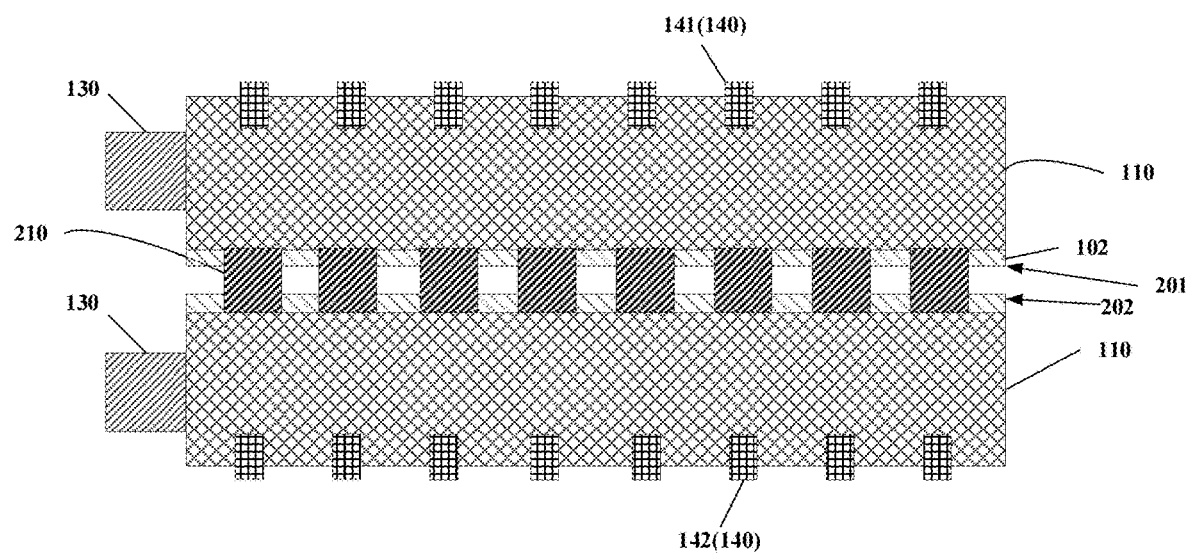
FIG. 7B is a bottom view showing a flexible battery according to another embodiment of the present disclosure.

FIG. 7A is a top view showing a flexible battery according to another embodiment of the present disclosure. FIG. 7B is a bottom view showing a flexible battery according to another embodiment of the present disclosure. FIG. 7A shows a front side of the flexible battery, and FIG. 7B shows a back side of the flexible battery opposite to the front side.

As shown in FIGS. 7A and 7B, the flexible battery comprises a connecting member, a plurality of energy storage members 210 electrically connected to the connecting member, and a conductive member 130 connected to a flexible conductive layer 110 of the connecting member. The connecting member may comprise a first connecting member 201 and a second connecting member 202 spaced from the first connecting member 201. The first connecting member 201 and the second connecting member 202 may be, for example, the connecting members shown in FIG. 2 respectively.

As shown in FIG. 7B, each energy storage member 210 comprises a positive electrode tab 141 and a negative electrode tab 142. The positive electrode tab 141 is connected to the flexible conductive layer 110 (which may be referred to as a first flexible conductive layer) of the first connecting member 201, and the negative electrode tab 142 is connected to the flexible conductive layer 110 (which may be referred to as a second flexible conductive layer) of the second connecting member 202. In this way, the plurality of energy storage members can be connected to two spaced connecting members.

In some embodiments of the present disclosure, an electronic device is also provided. The electronic device comprises the flexible battery as previously described (for example, the flexible battery as shown in FIG. 6A or 7A). For example, the electronic device may be a flexible electronic device or a wearable electronic device or the like.

Figure 8:
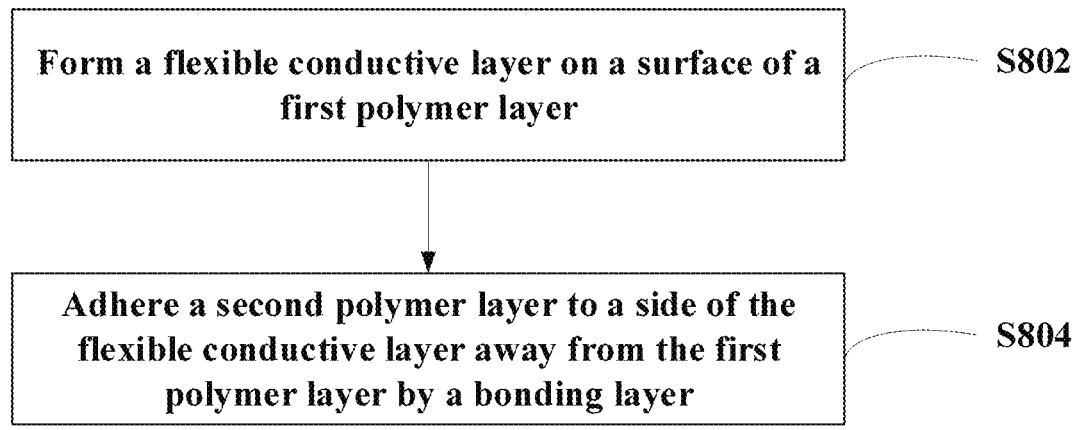
FIG. 8 is a flowchart showing a manufacturing method of a connecting member for a flexible battery according to an embodiment of the present disclosure.

FIG. 8 is a flowchart showing a manufacturing method of a connecting member for a flexible battery according to an embodiment of the present disclosure. As shown in FIG. 8, the manufacturing method comprises steps S802 to S804.

In step S802, a flexible conductive layer is formed on a surface of a first polymer layer. The flexible conductive layer is in direct contact with the first polymer layer.

In some embodiments, the flexible conductive layer is formed on the surface of the first polymer layer by a deposition process. For example, the deposition process comprises: at least one of a thermal evaporation process, a magnetron sputtering process, chemical vapor deposition, atomic layer deposition, electrodeposition, a spraying process, a chemical plating process, a spin coating method or a dip pulling method.

In step S804, a second polymer layer is adhered to a side of the flexible conductive layer away from the first polymer layer by a bonding layer.

So far, a manufacturing method of a connecting member for a flexible battery according to some embodiments of the present disclosure is provided. The manufacturing method comprises: forming a flexible conductive layer on a surface of a first polymer layer, wherein the flexible conductive layer is in direct contact with the first polymer layer; and adhering a second polymer layer to a side of the flexible conductive layer away from the first polymer layer by a bonding layer. Since the flexible conductive layer is directly formed on the surface of the first polymer layer in the above-described manufacturing method, compared with the flexible connecting member in the related art, the connecting member formed by the manufacturing method of the present disclosure can reduce the number of contact interfaces, which can reduce the risk of peeling-off of the interfaces between different layers, thereby improving the fatigue life of the connecting member.

Further, the flexible conductive layer is formed on the surface of the first polymer layer by the deposition process, which can enhance an adhesive force between the flexible conductive layer and the first polymer layer, thereby further improving the fatigue life of the connecting member.

In some embodiments, the manufacturing method further comprises: welding a tab for an energy storage member on the flexible conductive layer before adhering the second polymer layer to the side of the flexible conductive layer away from the first polymer layer. In this way, the electrical connection between the connecting member and the energy storage member may be achieved.

Figure 9A:
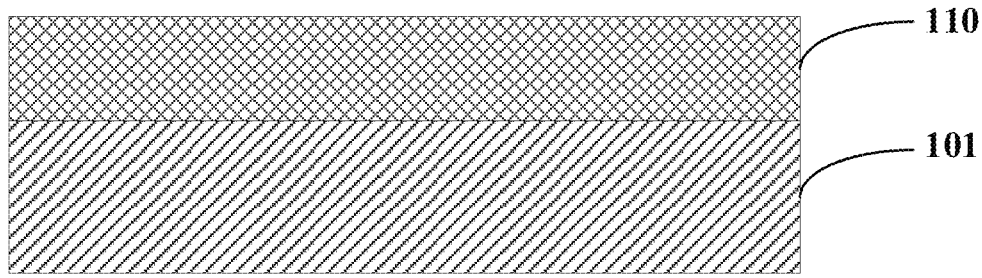
FIG. 9A is a schematic cross-sectional view showing a structure at a stage during a manufacturing process of a connecting member for a flexible battery according to an embodiment of the present disclosure.
Figure 9B:
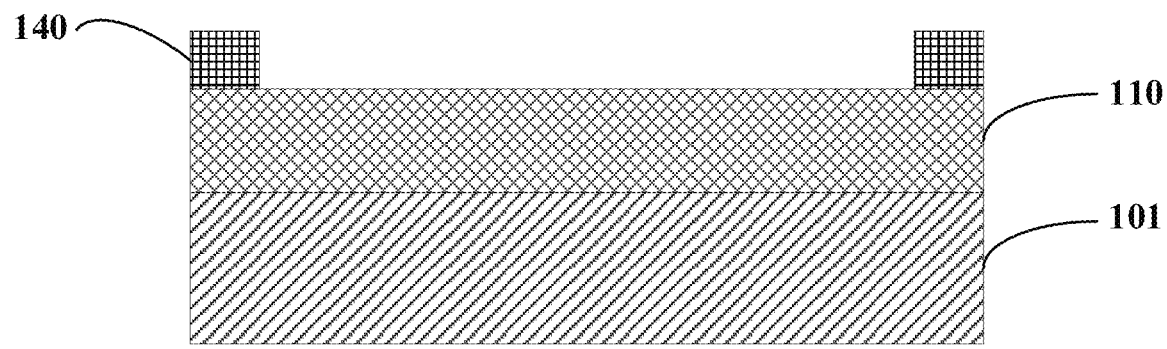
FIG. 9B is a schematic cross-sectional view showing a structure at another stage during a manufacturing process of a connecting member for a flexible battery according to an embodiment of the present disclosure.

FIGS. 9A and 9B are schematic cross-sectional views showing structures at several stages during a manufacturing process of a connecting member for a flexible battery according to an embodiment of the present disclosure. The manufacturing process of the connecting member for the flexible battery according to some embodiments of the present disclosure will be described in detail below in conjunction with FIGS. 9A to 9B and FIG. 4.

First, as shown in FIG. 9A, a flexible conductive layer 110 is formed on a first polymer layer 101 by a deposition process.

Next, as shown in FIG. 9B, a tab 140 for an energy storage member is welded on the flexible conductive layer 110. For example, the tab 140 can be welded on the flexible conductive layer 110 by ultrasonic waves.

In some embodiments, a plurality of energy storage members may be arranged in parallel at equal intervals, and directions of a positive electrode tab and a negative electrode tab of each energy storage member coincide with each other respectively; all the positive electrode tabs are welded on one flexible conductive layer (for example, the first flexible conductive layer), and all the negative electrode tabs are welded on another flexible conductive layer (for example, the second flexible conductive layer).

In addition, a conductive member may also be welded on the flexible conductive layer. For example, a first conductive member is welded on the first flexible conductive layer, and a second conductive member is welded on the second flexible conductive layer.

Next, as shown in FIG. 4, the second polymer layer 102 is adhered to a side of the flexible conductive layer 110 away from the first polymer layer 101 by the bonding layer 120. The bonding layer 102 covers at least a portion of the tab 140.

So far, a manufacturing method of a connecting member for a flexible battery according to some embodiments of the present disclosure is provided. The manufacturing method can improve the fatigue life of the connecting member.

In some embodiments, the second polymer layer 102 may have through holes exposing the tabs. During the subsequent process of manufacturing the flexible battery, other portions of the plurality of energy storage members than the tabs may be provided on the connecting member (for example, by way of adhesion), so that the other portions of the plurality of energy storage members are connected to the tabs through the above-described through holes, thereby manufacturing a flexible battery.

In other embodiments, after the flexible conductive layer 110 is formed on the first polymer layer 101, the second polymer layer 102 may also be adhered to a side of the flexible conductive layer 110 away from the first polymer layer 101 by the bonding layer 120, wherein the second polymer layer has through holes exposing a portion of the flexible conductive layer. In this way, the connecting member is formed. Then, during the subsequent process of manufacturing a flexible battery, a plurality of energy storage members are provided on the connecting member, and the tabs of the plurality of energy storage members are connected to the flexible conductive layer through the above-described through holes. In this way, a flexible battery is formed.

In some embodiments, the process of manufacturing a flexible battery further comprises: connecting a conductive member to the flexible conductive layer of the connecting member, for example, by a welding process.

In some embodiments, the process of manufacturing a flexible battery further comprises: forming an encapsulation layer surrounding the connecting member and the plurality of energy storage members.

Figure 10A:
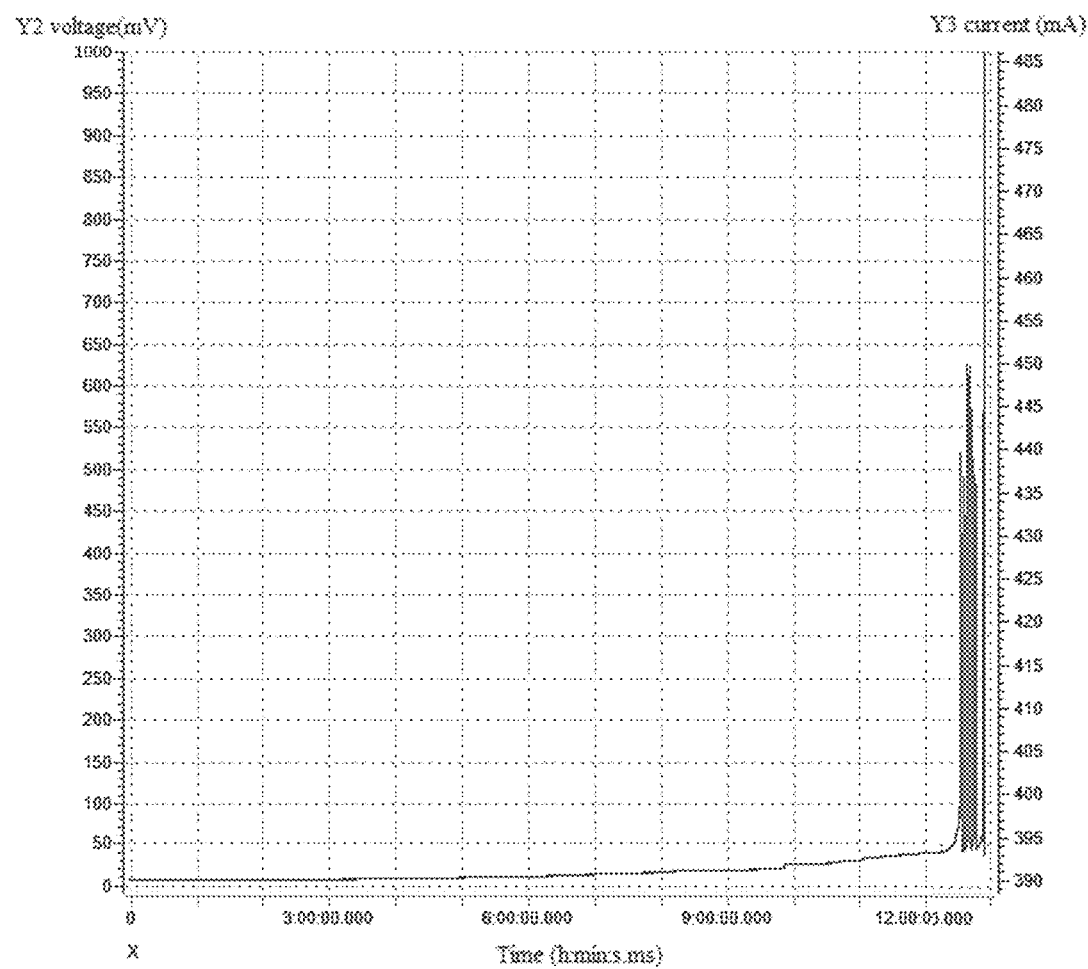
FIG. 10A is a view showing a fatigue life test result of a connecting member for a flexible battery in the related art.

FIG. 10A is a view showing a fatigue life test result of a connecting member for a flexible battery in the related art.

The fatigue life test is performed on the flexible connecting member in the related art. For example, the flexible connecting member is bent with a bending radius of 15 millimeters (mm), a bending angle of 0 to 180°, and a cycle rate of 2.6 s/cycle, and voltage-current tests are performed under a constant current condition of 0.2 C. Here, each cycle means that the flexible connecting member is bent back and forth once.

It should be noted that, 0.2 C represents the charge/discharge multiplier of the flexible battery, which indicates the speed of the charge and discharge. The charge/discharge multiplier is a ratio of a charge/discharge current to a rated capacity. For example: when a battery with a rated capacity of 100 Ah (ampere hour) is discharged with a current of 20 A (ampere), its discharge multiplier is 0.2 C. When the discharge of the used capacity is completed in one hour, it is referred to as 1 C discharge; when the discharge of the used capacity is completed in five hours, it is referred to as 0.2 C discharge.

In the fatigue life test of the flexible connecting member, when the flexible connecting member is fractured, the test circuit will be open, which results in a voltage surge. Therefore, it can be determined whether the flexible connecting member is fractured by observing a variation condition of the test curve. As shown in FIG. 10A, the voltage surge in about 13 hours, and it is obtained by calculation that: 13×3600s/2.6 s=18K times. That is, the fatigue life of the flexible connecting member in the related art is about 18K times.

Figure 10B:
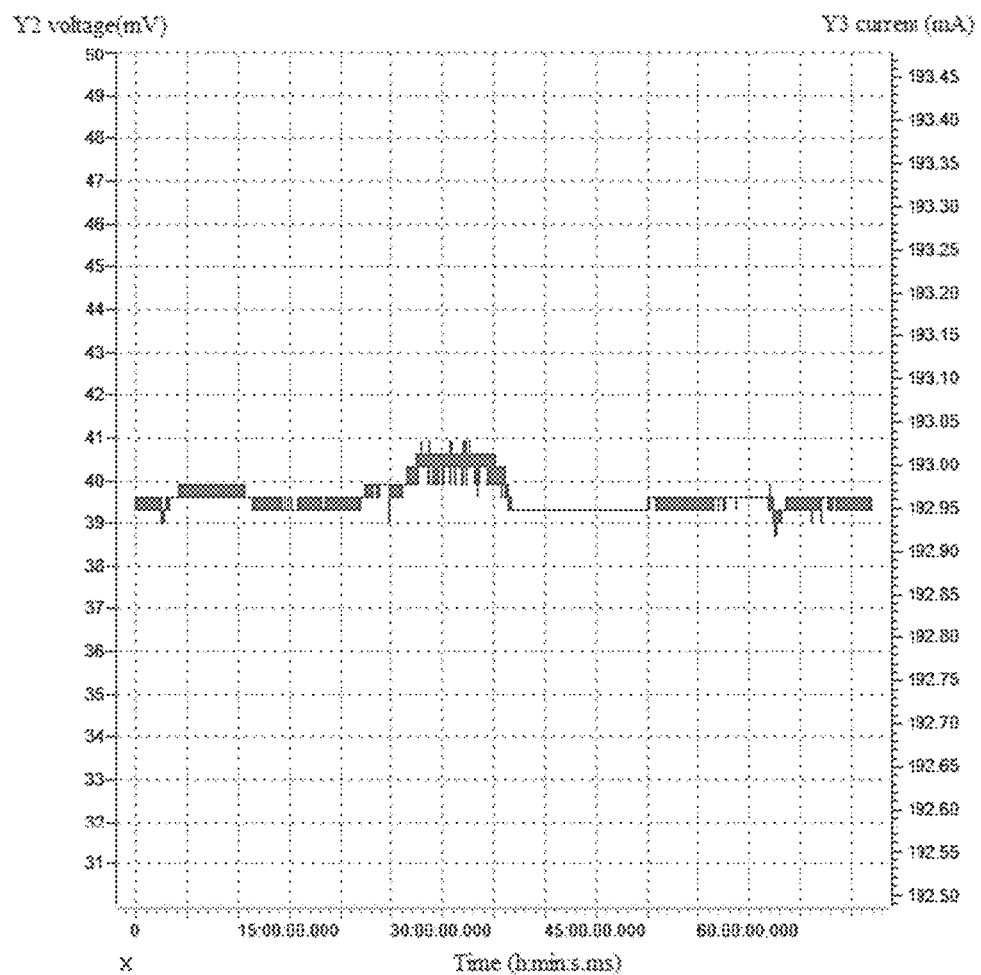
FIG. 10B is a view showing a fatigue life test result of a connecting member for a flexible battery according to an embodiment of the present disclosure.

FIG. 10B is a view showing a fatigue life test result of a connecting member for a flexible battery according to an embodiment of the present disclosure.

Here, for the connecting member according to some embodiments of the present disclosure, the same test condition as the fatigue life test of the flexible connecting member in the related art is used. As shown in FIG. 10B, there is still no voltage surge occurring until 72.5 hours in the test, which indicates that the connecting member according to the embodiments of the present disclosure can still work without fracture at least until 72.5 hours, that is, bending for 100K times (i.e., 72.5×3600 s/2.6 s≈100K times). By comparing the test results shown in FIGS. 10A and 10B, it can be seen that, compared with the flexible connecting member in the related art, the connecting member according to the embodiments of the present disclosure has a better fatigue life.

Hereto, various embodiments of the present disclosure have been described in detail. Some details well known in the art are not described in order to avoid obscuring the concept of the present disclosure. According to the above description, those skilled in the art would fully understand how to implement the technical solutions disclosed here.

Although some specific embodiments of the present disclosure have been described in detail by way of examples, those skilled in the art should understand that the above examples are only for the purpose of illustration but not for limiting the scope of the present disclosure. It should be understood by those skilled in the art that modifications to the above embodiments or equivalently substitution of part of the technical features may be made without departing from the scope and spirit of the present disclosure. The scope of the present disclosure is defined by the appended claims.

What is claimed is:

1. A flexible battery, comprising:
   a connecting member comprising:
      a first polymer layer;
      a flexible conductive layer on a surface of the first polymer layer, wherein the flexible conductive layer is in direct contact with the first polymer layer, and comprises a first flexible conductive layer and a second flexible conductive layer spaced apart from the first flexible conductive layer;
      a bonding layer on a side of the flexible conductive layer away from the first polymer layer; and
      a second polymer layer on a side of the bonding layer away from the flexible conductive layer, wherein the first flexible conductive layer and the second flexible conductive layer are separated by the second polymer layer; and
   a plurality of energy storage members located on the connecting member, and electrically connected to the connecting member, each of the plurality of energy storage members comprising a positive electrode tab and a negative electrode tab, wherein the positive electrode tab of each of the plurality of energy storage members is connected to the first flexible conductive layer, and the negative electrode tab of each of the plurality of energy storage members is connected to the second flexible conductive layer;
   wherein each of the plurality of energy storage members is cross-arranged with the first flexible conductive layer, and is cross-arranged with the second flexible conductive layer.

2. The flexible battery according to claim 1, wherein:
   extending directions of any two energy storage members of the plurality of energy storage members are parallel;
   an extending direction of the first flexible conductive layer is parallel to an extending direction of the second flexible conductive layer; and
   the extending direction of the first flexible conductive layer is perpendicular to an extending direction of any one of the plurality of energy storage members.

3. The flexible battery according to claim 2, wherein the plurality of energy storage members are arranged at equal intervals along the extending direction of the first flexible conductive layer, and the first flexible conductive layer and the second flexible conductive layer are arranged along the extending direction of any one of the plurality of energy storage members.

4. The flexible battery according to claim 1, further comprising: a conductive member connected to the flexible conductive layer of the connecting member.

5. The flexible battery according to claim 1, further comprising: an encapsulation layer surrounding the connecting member and the plurality of energy storage members.

6. An electronic device comprising: the flexible battery according to claim 1.

7. A manufacturing method of a flexible battery, comprising:
   forming a connecting member and a plurality of energy storage members on the connecting member, comprising:
      forming a flexible conductive layer on a surface of a first polymer layer, wherein the flexible conductive layer is in direct contact with the first polymer layer, and comprises a first flexible conductive layer and a second flexible conductive layer spaced apart from the first flexible conductive layer; and adhering a second polymer layer to a side of the flexible conductive layer away from the first polymer layer by a bonding layer, wherein the first flexible conductive layer and the second flexible conductive layer are separated by the second polymer layer;

wherein each of the plurality of energy storage members comprises a positive electrode tab and a negative electrode tab, the positive electrode tab of each of the plurality of energy storage members is connected to the first flexible conductive layer, and the negative electrode tab of each of the plurality of energy storage members is connected to the second flexible conductive layer;

wherein each of the plurality of energy storage members is cross-arranged with the first flexible conductive layer, and is cross-arranged with the second flexible conductive layer.

8. The manufacturing method according to claim 7, wherein the flexible conductive layer is formed on the surface of the first polymer layer by a deposition process.

9. The manufacturing method according to claim 8, wherein the deposition process comprises: at least one of a thermal evaporation process, a magnetron sputtering process, chemical vapor deposition, atomic layer deposition, electrodeposition, a spraying process, a chemical plating process, a spin coating method or a dip pulling method.

10. The manufacturing method according to claim 7, further comprising:

welding the positive electrode tab on the first flexible conductive layer and welding the negative electrode tab on the second flexible conductive layer before adhering the second polymer layer to the side of the flexible conductive layer away from the first polymer layer.

11. The flexible battery according to claim 1, wherein the bonding layer covers at least a portion of the positive electrode tab and at least a portion of the negative electrode tab.

12. The flexible battery according to claim 1, wherein a material of the flexible conductive layer comprises: at least one of metal, conductive polymer or non-conductive polymer with a treated metal surface.

13. The flexible battery according to claim 1, wherein materials of the first polymer layer and the second polymer layer each comprise: at least one of polyimide, polyethylene terephthalate or polyvinylidene chloride.

14. The flexible battery according to claim 1, wherein the bonding layer comprises: at least one of natural rubber, synthetic rubber, thermoplastic elastomer, polyacrylate, polyurethane, polyvinyl chloride or polyvinyl ether.

* * * * *